United States Patent

[11] 3,589,371

| | | |
|---|---|---|
| [72] | Inventor | Leo Conrad Laporte |
| | | Montreal, Quebec, Canada |
| [21] | Appl. No. | 858,518 |
| [22] | Filed | Sept. 16, 1969 |
| [45] | Patented | June 29, 1971 |
| [73] | Assignee | Imperial Tobacco Company of Canada, Limited |
| | | Montreal, Quebec, Canada |
| [32] | Priority | June 29, 1965 |
| [33] | | Canada |
| [31] | | 934,634 |
| | | Continuation-in-part of application Ser. No. 539,657, Apr. 4, 1966, now Patent No. 3,483,872. |

[54] CIGAR HOLDER
4 Claims, No Drawings

[52] U.S. Cl. .................................................. 131/12,
131/187, 131/230
[51] Int. Cl. ....................................................... A24f 7/00,
A24f 13/00
[50] Field of Search .................................... 131/9, 10,
11, 12, 187, 230

[56] References Cited
UNITED STATES PATENTS

| | | | |
|---|---|---|---|
| 1,671,182 | 5/1928 | Eberlein et al. ................ | 131/12 |
| 2,782,180 | 2/1957 | Weidman .................. | 264/122 X |
| 3,072,593 | 1/1963 | Marx et al. ..................... | 264/122 X |
| 1,987,354 | 1/1935 | Albert ...................... | 131/187 |
| 3,120,670 | 2/1964 | Amoded ...................... | 128/359 |
| 3,137,303 | 6/1964 | Shaw ............................ | 131/187 |

FOREIGN PATENTS

| | | | |
|---|---|---|---|
| 2,114 | 1861 | Great Britain ................ | 131/219 |

*Primary Examiner*—Melvin D. Rein
*Attorney*—Smart & Biggar

ABSTRACT: A molded polyolefin flexible cigar tip having a flavoring agent, such as a sweetening agent, coffee flavor, etc., incorporated therein which is adapted to discharge continuously into the mouth when the tip is held between the teeth. The polyolefin utilized has a density in the range of 0.90 to 1.93 and a melt index in the range of 18 to 29.

CIGAR HOLDER

This invention is a continuation-in-part of U.S. Application Ser. No. 539,657, filed Apr. 4, 1966, now Pat. No. 3,483,872.

BACKGROUND OF THE INVENTION

1. Field of the Invention

This invention relates to a molded polyolefin flexible cigar tip or holder containing a flavoring agent and a method for the manufacture thereof.

2. Description of the Prior Art

In the manufacture of many types of cigars, it is common practice to include at the end of the cigar intended to be put in the mouth of the smoker a sweetening agent so that the sweetening agent is discharged into the mouth during the smoking of the cigar. This provides a sweet taste on the smoker's tongue as he smokes the cigar and thus provides the cigar with a characteristic taste. Typical sweetening agents used for this purpose are saccharin, sodium saccharin or sodium or calcium cyclamate and these are conveniently included in the adhesive e.g. gum tragacanth with which the free end of the binder and the wrapper are sealed in the manufacture of the cigar.

However, it has now common practice for cigar manufacturers to sell their cigars complete with the cigar holders that are commonly known in the trade as flexible tips. With these flexible tips, the manufacturers of cigars have had to find alternative means for discharging sweetening agent into the smoker's mouth from the cigar as the smoker's mouth does not come into direct contact with the cigar.

Manufacturers of flexible tips have provided flavor by coating the tips with compositions containing flavoring agents. Then tips give out flavor only during the early part of smoking a cigar. There is no continuous release of flavor. This has long been recognized as a disadvantage although it should be pointed out that untipped cigars only give out flavor for similar, limited period. This is mainly because the tobacco of the cigar absorbs considerable quantities of saliva as soon as the cigar is placed between the teeth.

The idea of incorporating a flavoring agent in a pipe or cigar tube is very old and was suggested as early as 1861 in Hyams, British Pat. No. 2,114. However, Hyams was concerned with mixing various flavoring agents with clay which was subsequently molded and baked into the form of pipes or cigar tubes. Baked clay is a totally different material from modern polyolefin resins.

In particular, baked clay has a porous nature which would be expected to be capable of releasing flavoring agents. A molded polyolefin article, because of its unporous nature, would not be expected to exhibit this characteristic.

SUMMARY OF THE INVENTION

It has now been found that when a flavoring agent is intimately admixed with a molding powder of a low density polyolefin having a density in the range 0.90 to 0.93 and a melt index in the range 18 to 29 and the resultant mixture molded into a cigar tip, the tip has a surprising property. This property is the ability to provide a continuous discharge of flavor into the mouth of a smoker of the cigar. Low density polyolefins, like all thermoplastic resins, are not porous. It is doubtful whether one skilled in the art would ever have expected the flavoring in the outermost layer of the tip to be discharged. How the tips according to the present invention provide a continuous release of flavor is not fully understood but is believed to be caused by the flexing of the tip between the teeth of the smoker. Low density polyolefins of the above specified density and melt index have the necessary flexibility to provide the surprising advantage of this invention.

While it is only necessary for that part of the cigar holder normally held in the mouth during smoking to have the flavoring agent therein, it is most convenient and commercially practicable, particularly where one piece holders, e.g. flexible tips are being molded, that the whole of the holder is molded from the resin containing the flavoring agent.

DESCRIPTION OF PREFERRED EMBODIMENTS

A very wide variety of flavoring agents can be used according to the invention and it is only necessary that they be stable at the molding temperature of the resin. Among suitable flavoring agents there can be mentioned synthetic sweetening agents such as saccharin, sodium saccharin and sodium and calcium cyclamate, artificial coffee flavor, fruit flavors, liqueur flavors, spices, aromatics vanilla, maple menthol, peppermint licorice, etc. The flavors are used either alone or in combination and can be used either in powder form or in liquid form absorbed on a powder such as dextrose or gum tragacanth.

It has been found that the inclusion of the flavoring agent in the resin has essentially no effect on the conventional process by which the cigar tips are molded. Thus, conventional techniques and machines may be used.

The amount of flavoring agent present in the polyolefin molding powder and, as such, in the product cigar tip, is not critical and is purely subjective in that it depends upon the level of flavor which the cigar manufacturer desires to be present in the smoker's mouth. For example, the aforesaid synthetic sweetening agents are particularly effective sweetening agents in that small amounts produce a strong sweetening effect and amounts in the range 1 to 25 percent by weight based on the weight of the resin have been found to be generally suitable.

Polyethylene and polypropylene of the requisite density and melt index have been found to be particularly suitable as low density polyolefins.

The invention is illustrated by the following nonlimitative examples:

Example 1

A molding powder was prepared containing the following ingredients (all percentages by weight)

|  | Percent |
| --- | --- |
| Low density polyethylene pellets (Sclair Resin No. 2113, density, 0.92, Melt index, 29) | 95 |
| Insoluble saccharin in powder form (O-sulfobenzoic-imide) | 5 |

The ingredients were blended to a uniform mixture and the blend was fed into a screw extruder where it was heated, melted and thoroughly mixed and finally extruded in the form of small particles. The maximum temperature in the extruder was 350° F.

Cigar tips were then formed from the pieces of extruded, blended material by injection molding. For injection molding the resin blend was heated and melted to a viscous liquid in a heating cylinder. Then, by means of a ram it was forced into a mold, allowed to solidify and ejected by air.

The molding conditions were as follows:

Ram pressure—640 p.s.i.
Injection temp.—230–240° F.
Cycle Time—11–13 secs.
Mold Temp.:
    Front half—150° F.
    Back half—550° F.

The cigar tips obtained provided a pleasant sweet taste in the mouth during the full time of smoking a cigar.

Example 2

A molding powder was prepared containing the following ingredients:

|  | Percent |
| --- | --- |
| Sclair Resin No. 2113 | 95 |
| Insoluble saccharin in powder form | 2 |
| Coffee flavor | 1.5 |
| Color | 1.5 |

The coffee flavor used was a synthetic coffee flavor in spray dried form available under the trade name Aromalok Coffee Imitation No. 31283, while the coloring agent was Brown N. Br114, composed of three nontoxic cadmium pigments.

The above ingredients were blended, extruded and molded under the same conditions as were used in example 1 and cigar tips were obtained having a very pleasant coffee flavor.

Example 3

A molding powder was prepared containing the following ingredients:

|  | Percent |
| --- | --- |
| Low density polyethylene pellets (Sclair resin No. 2113) | 95.7 |
| Anise flavor, Percel No. 35400 | 4.0 |
| Ivory color | 0.3 |

The flavor used is commercially available from Fritzsche Bros. Inc. of New York. It has given new excellent results at levels in the range 2 to 10 percent by weight of the above mix.

The above ingredients were blended, extruded and molded under the same conditions as were used in Example 1 and cigar tips were obtained having a very pleasant flavor.

Example 4

A molding powder was prepared containing the following ingredients:

|  | Percent |
| --- | --- |
| Low density polyethylene pellets (Sclair resin 2113, density 0.920, melt index=29) | 96.7 |
| Creme de menthe flavor, Percel No. 39055 | 3.0 |
| Ivory color | 0.3 |

The flavor used is commercially available from Fritzsche Bros. Inc. of New York. It has given new excellent results at levels in the range 2 to 10 percent by weight of the above mix.

The above ingredients were blended, extruded and molded under the same conditions as were used in Example 1 and cigar tips were obtained having a very pleasant flavor.

What I claim as my invention is:

1. A flexible cigar tip adapted to continuously discharge a flavoring agent into the mouth of a smoker, said tip having at least that portion normally held in the mouth molded from a low density polyolefin having a density in the range 0.90 to 0.93 and a melt index in the range 18 to 29 containing a flavoring agent, said flavoring agent being stable at the molding temperature of the resin.

2. A flexible cigar tip as claimed in claim 1 wherein the entire tip is formed from the low density polyolefin containing the flavoring agent.

3. A flexible cigar tip as claimed in claim 1 wherein the low density polyolefin is low density polyethylene.

4. A flexible cigar tip as claimed in claim 2 in combination with a cigar.